Oct. 29, 1968    J. L. DUDA, JR    3,408,108
WAGON WITH DESCENDING FLOOR
Filed Dec. 20, 1966    7 Sheets-Sheet 5
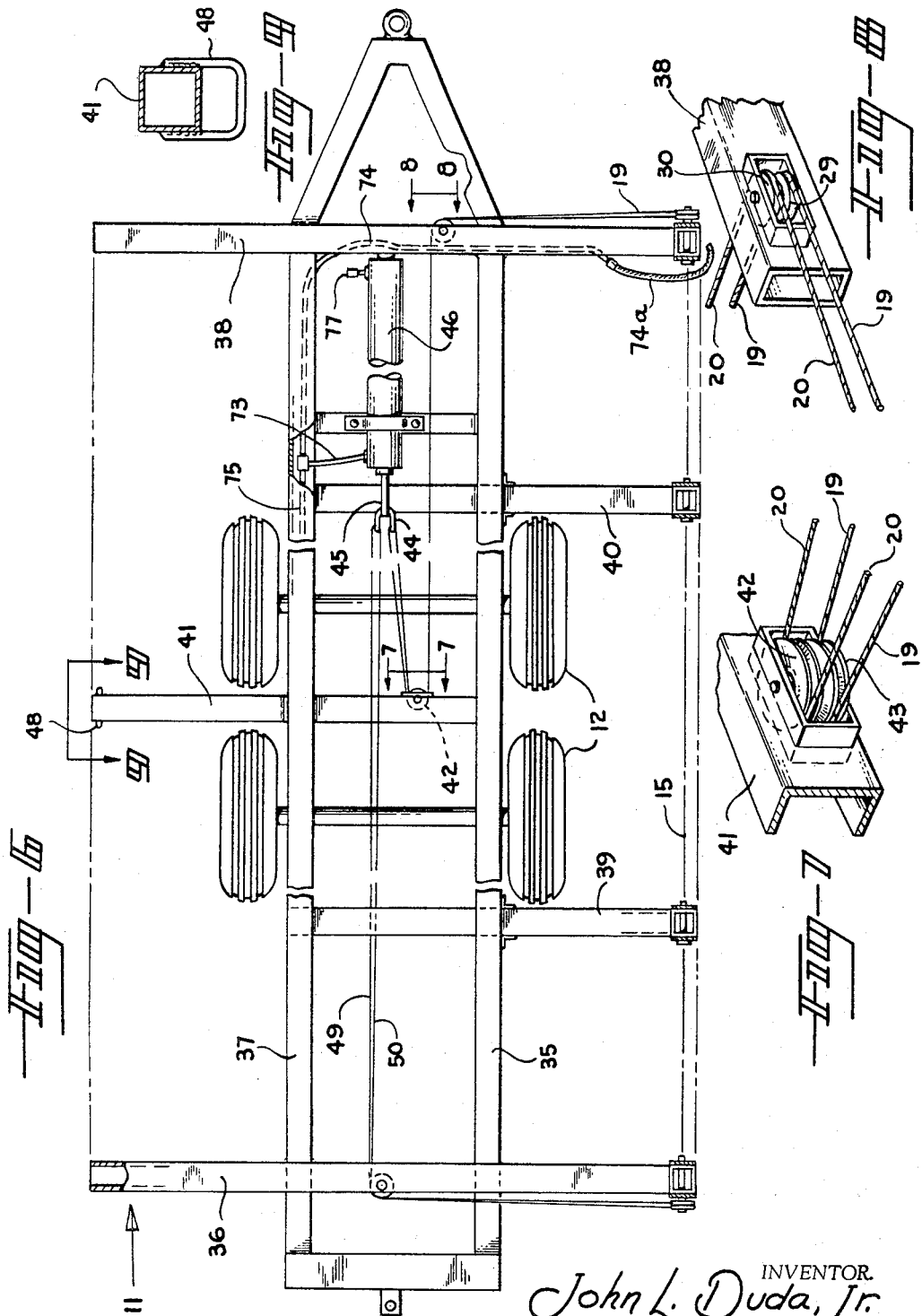
INVENTOR.
John L. Duda, Jr.
BY
Julian C. Renfro Oct. 29, 1968    J. L. DUDA, JR    3,408,108
WAGON WITH DESCENDING FLOOR
Filed Dec. 20, 1966    7 Sheets-Sheet 6
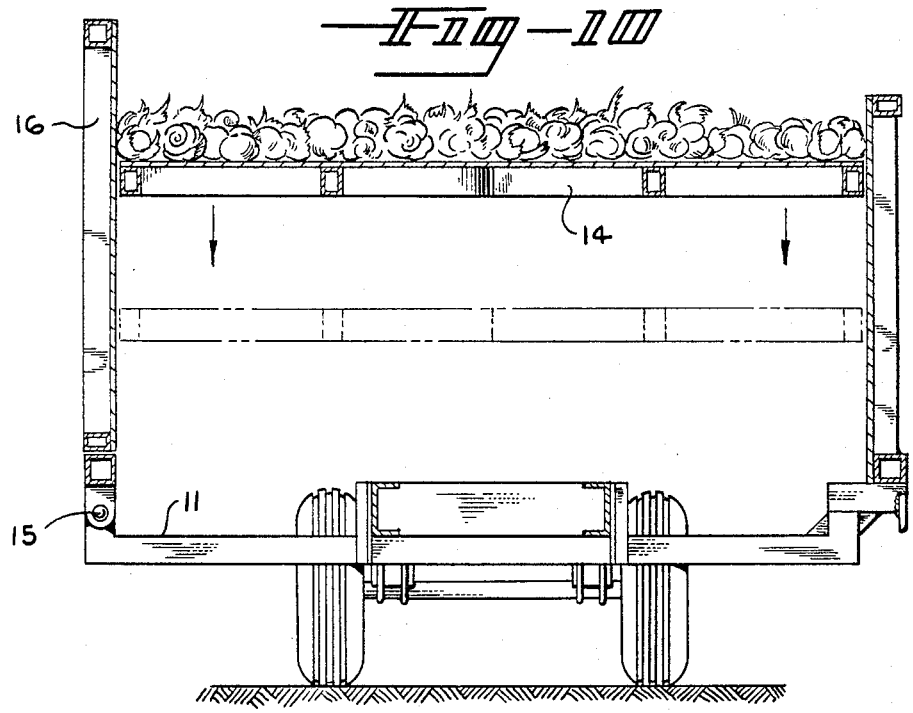
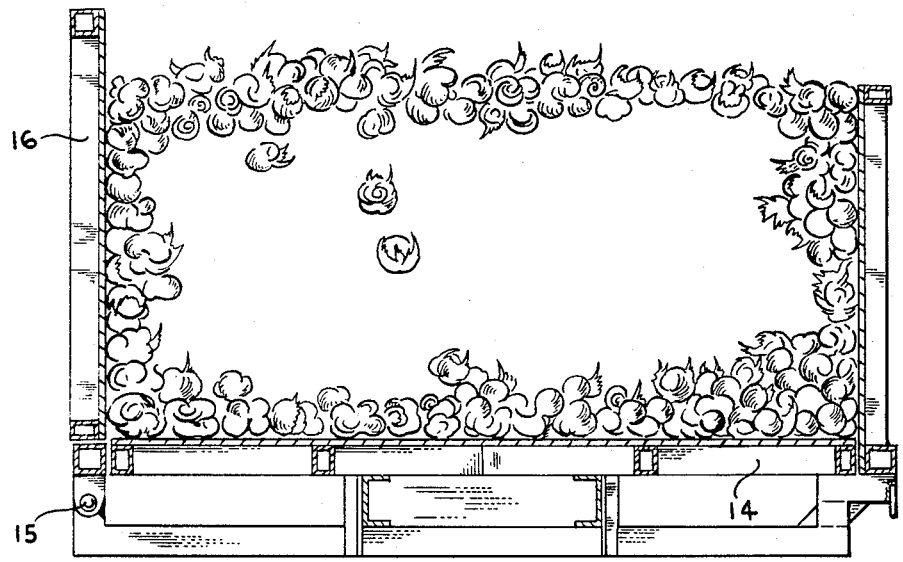
INVENTOR
John L. Duda, Jr.
BY Julian C. Renfro
ATTORNEY

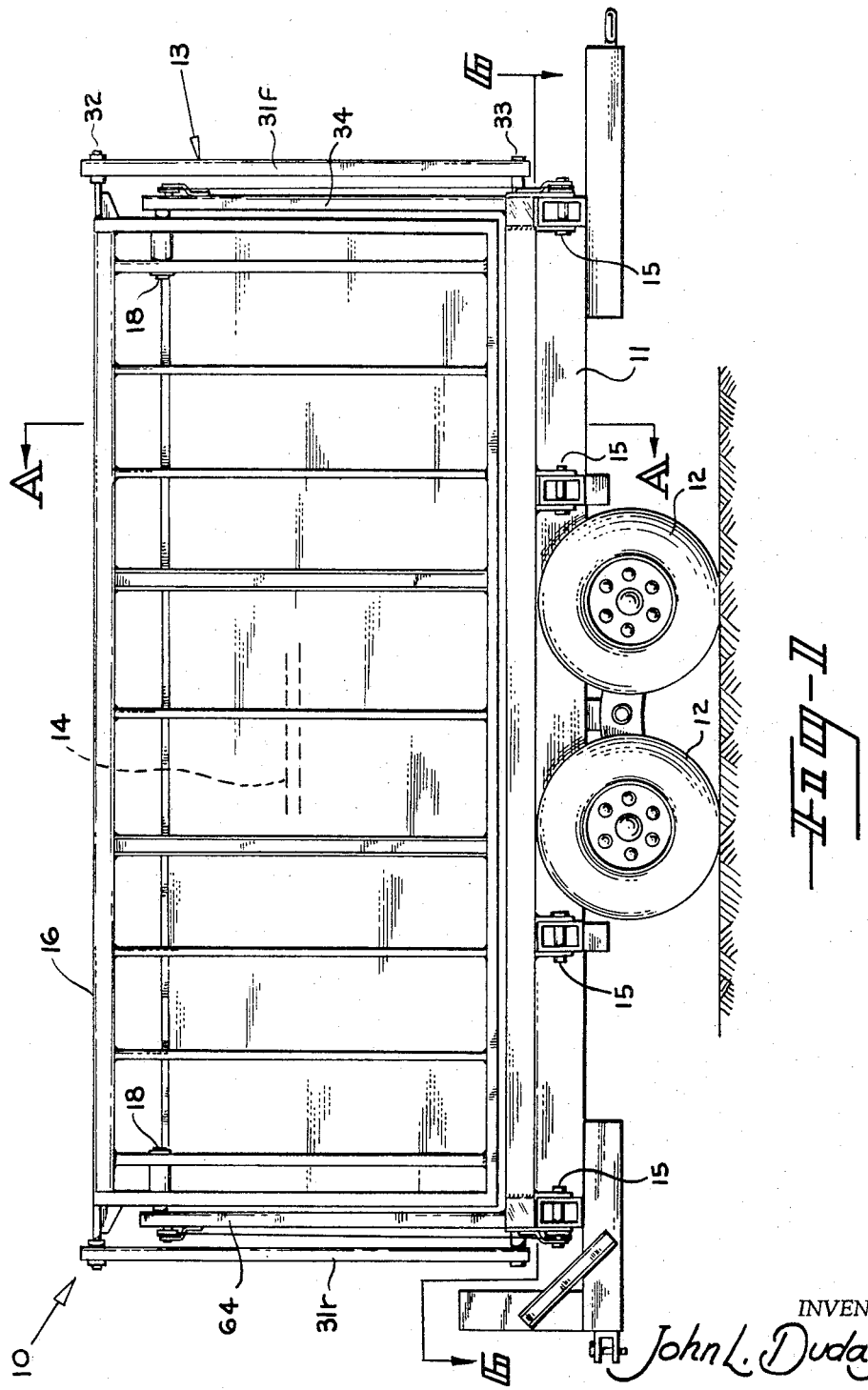

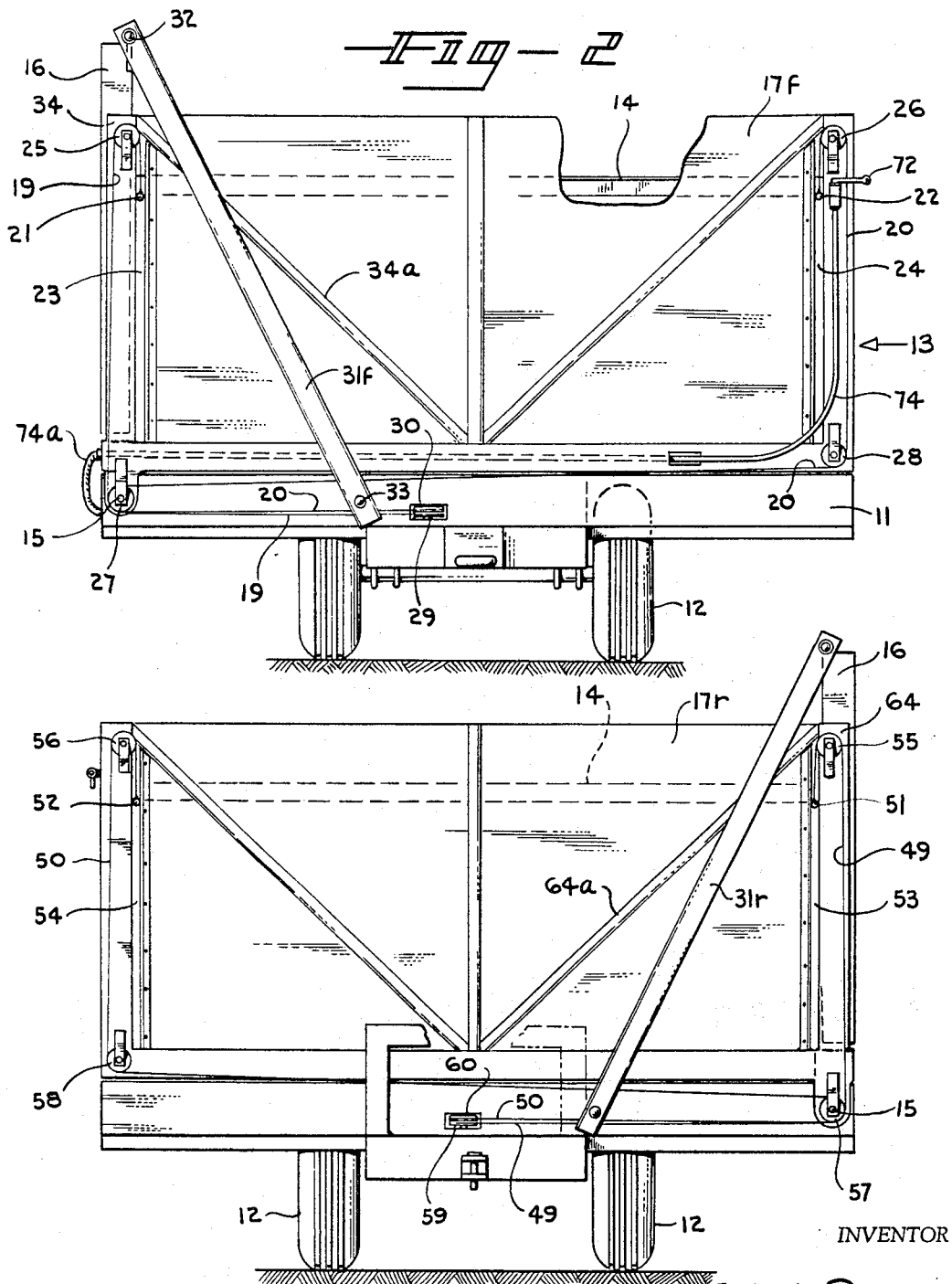

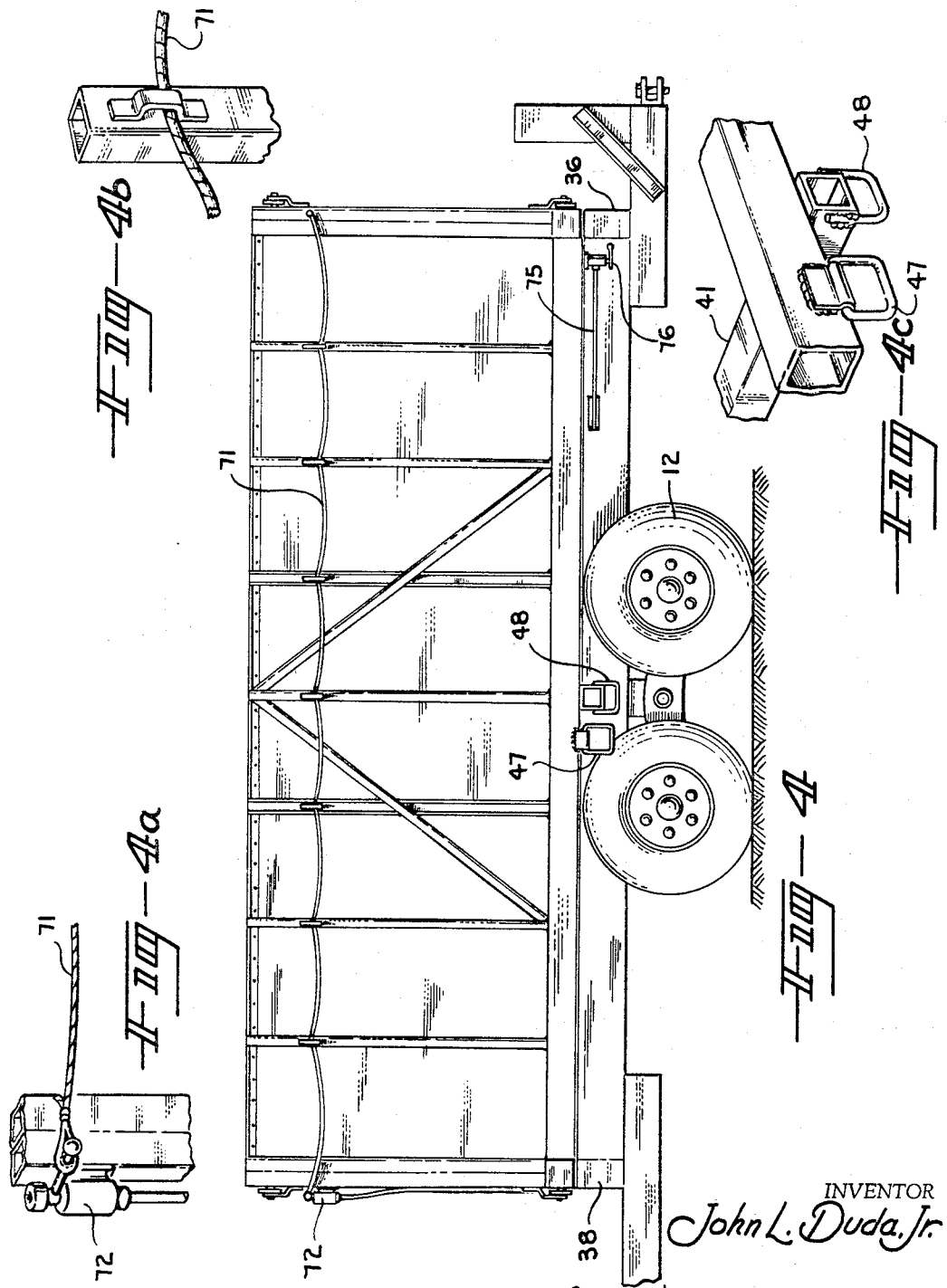

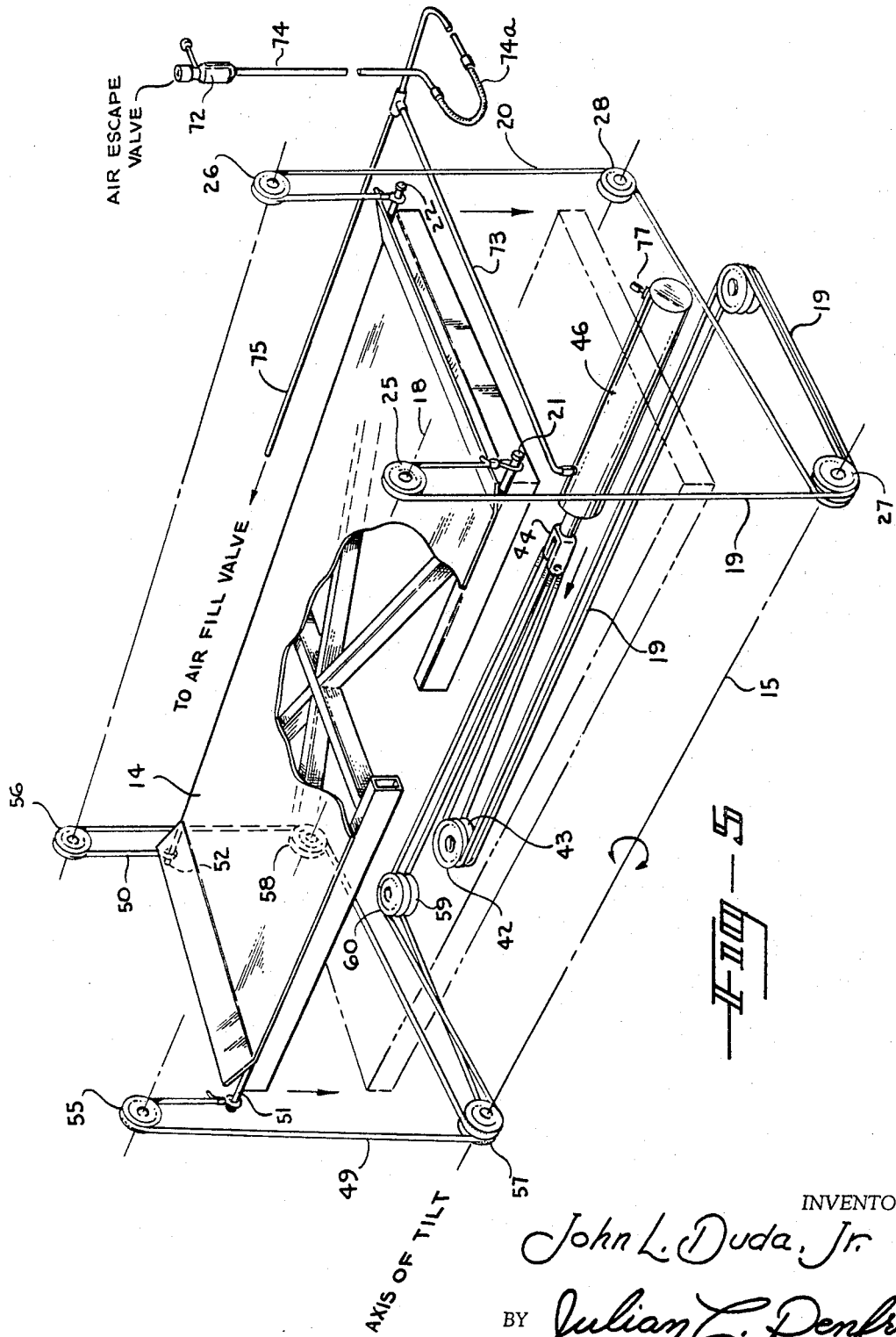

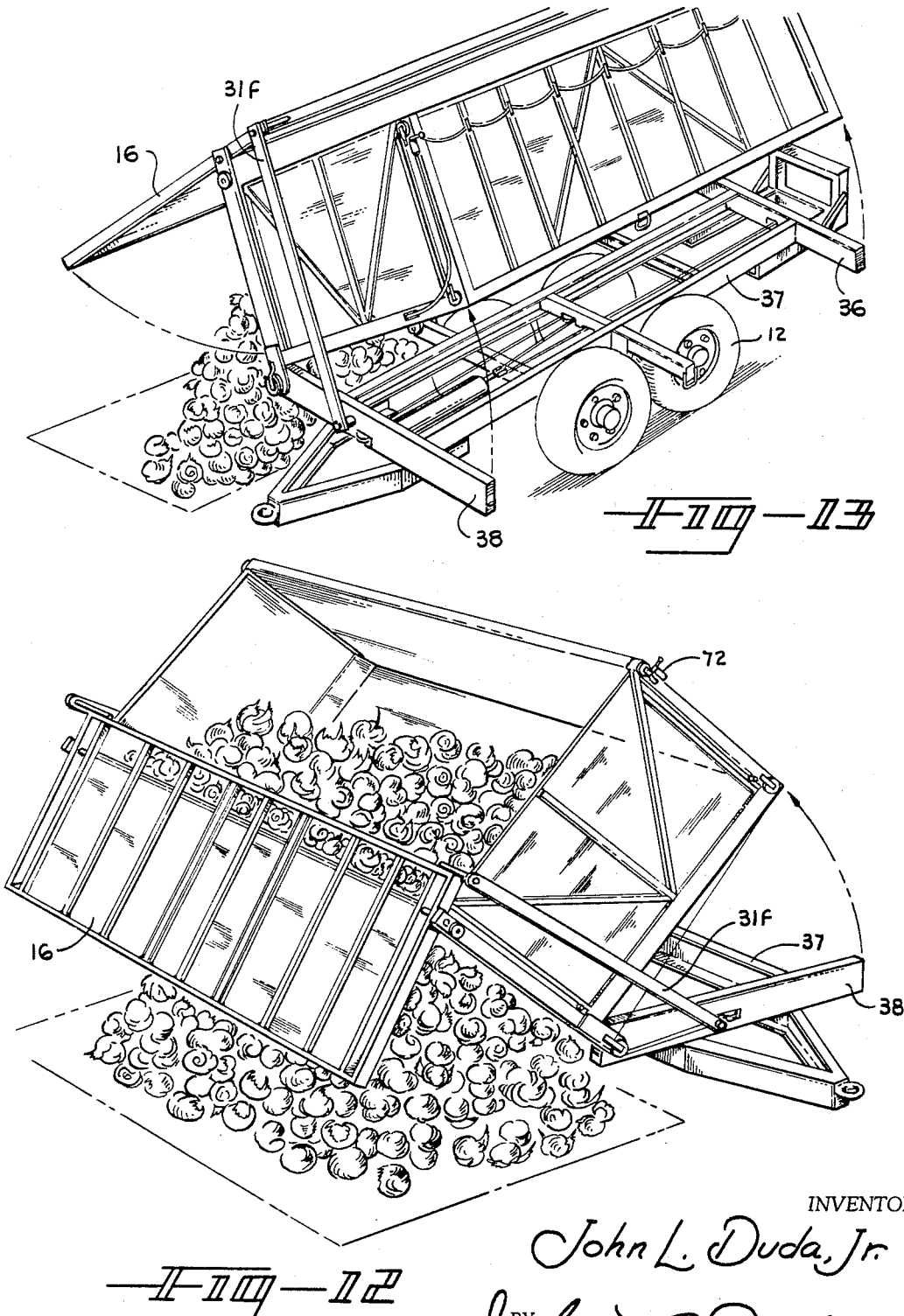

United States Patent Office 3,408,108
Patented Oct. 29, 1968

3,408,108
WAGON WITH DESCENDING FLOOR
John L. Duda, Jr., Rte. 1, Box 91A,
Oviedo, Fla. 32765
Filed Dec. 20, 1966, Ser. No. 603,225
7 Claims. (Cl. 298—18)

ABSTRACT OF THE DISCLOSURE

This invention relates to a wagon that is eminently suited for use in the field in connection with the loading and unloading of produce, in that it advantageously utilizes a movable floor that gradually may be lowered from a raised position as the loading of the wagon with produce progresses. In this manner the height the produce must fall inside the wagon is minimized, thus avoiding in most instances any damage to the produce that might have otherwise occurred during the loading procedure. The suspension arrangement for the floor is of such construction that it does not interfere with a tilting of the upper portion of the wagon during the subsequent unloading procedure, and also it does not cause any marked change in the perpendicular relation the floor bears to the sides of the upper portion of the wagon.

---

This invention relates to a wagon used for carrying produce or the like and equipped with a floor that can be maintained as high as possible during each phase of the loading process, thus to minimize any damaging of the produce, and more particularly to a wagon having a floor suspended within the upper body portion of the wagon, which floor can be lowered virtually automatically as the wagon is filled, yet with the upper body portion still being tiltable to unload the produce rapidly.

In the past a number of wagons or dollies have been proposed that have various movable portions to facilitate loading and unloading, and some of these have included various types of movable bottoms. Other such devices have utilized the principle extensively used in connection with railroad dump cars wherein one side of the car lifts away at the time of dumping of the car so as to let the contents of the car pour out sideways in an unobstructed manner. However, it was not until the advent of the present invention that a truly optimum wagon configuration was evolved by the use of which the wagon can be loaded in a minimum time without bruising the produce, and after transporting it, thereafter unloaded for example directly into a large vat of water for subsequent packing procedures.

In accordance with this invention I provide a basic bed or chassis equipped with wheels as well as hitches fore and aft that enable any of a number of such wagons to be pulled in a long line through a field so that each of the wagons can each be gradually loaded with produce. Hingedly mounted at several locations along one side of the bed of each wagon is the upper body portion principally constituted by four upstanding sides and a floor portion. By virtue of a novel arrangement defined hereinafter, the floor portion is in effect suspended within the area defined by the four sides, which floor can be easily lowered by the operator as the wagon becomes filled. Significantly, the floor portion is gradually moved toward its lowermost position until such time as the wagon is filled, thus at all times minimizing the height for the produce to drop inside the wagon. After the wagon has been filled, it is then to be pulled to the packing house to be unloaded. At that time another important facet of this invention comes into play, that is, a rapid unloading procedure is utilized whereby the contents can be rapidly emptied without additional handling being necessary.

In order to enable the floor of the wagon to be lowered automatically on an increment by increment basis by the operator in the field, I provide floor supporting means preferably involving a plurality of cables attached to said movable floor and to an energy storage means from which energy may be selectively released by the operator, thus to enable him to lower the floor as the loading progresses. Although I am not to be so limited, I prefer to utilize as the energy storage means a large pneumatic cylinder disposed in a generally horizontal manner between the principal fore and aft structural members constituting the bed of the trailer. A head member on the piston rod of the pneumatic cylinder serves as the attachment point for four cables that are used for suspending the four corners of the floor, with the length of these cables being such that as air is allowed to escape in a controlled manner from the cylinder, the piston moves so as to release the cables evenly, several inches at a time, thus allowing the floor to move downwardly and thus make room for additional produce to be added at the top of the wagon.

As is therefore to be seen, the operator gradually releases air from the cylinder to achieve a lowering of the floor, with an air supply on the tractor used after the unloading procedure to force the piston of the pneumatic cylinder to the position in which it pulls the floor of the wagon back to the elevated position so that the loading process may again be commenced.

It is therefore a principal object of this invention to provide a novel wagon for the effective loading and unloading of produce, such being accomplished in a rapid manner without damage to the produce being likely to occur.

It is another object of this invention to provide a wagon in which the floor of the upper body portion of the wagon may be caused to descend incrementally in an even and controlled manner, with thereafter the entire upper body portion being tiltable to bring about a rapid unloading of the produce, with the design of the foregoing being such that the suspension arrangement for the floor does not interfere with the tilting of the upper body portion at the time that unloading is to be accomplished.

These and other objects, features and advantages will be more apparent from a study of the appended drawings in which:

FIGURE 1 is a side elevational view of a novel wagon in accordance with my invention, showing the movable floor in a position that is typical of a partially loaded condition, this view showing in detail the side of the wagon that tilts outwardly at the bottom for unloading purposes;

FIGURE 2 is a front view revealing the axis about which the upper body portion tilts, as well as certain portions of the mechanism responsible for the tilting of the side of the upper body portion to facilitate unloading, such tilting of the side automatically taking place as the upper body portion is tilted for unloading;

FIGURE 3 is a rear view of my novel wagon, showing the mechanism on the other end of the wagon that is responsible for accomplishing the tilting of the side of the upper body portion that is operated to facilitate unloading;

FIGURE 4 is a side elevational view of the side of the wagon from which the operator operates a valve to gradually lower the floor;

FIGURE 4a is a fragmentary view of the valve detail;

FIGURES 4b and 4c are additional fragmentary views;

FIGURE 5 is a simplified view showing the relationship of the movable floor to the cable suspension system and the pneumatic cylinder;

FIGURE 6 is a plan view taken along the lines 6—6 in FIGURE 1, this being taken below the floor level to reveal the bed or frame members that serve as the support for the upper body portion, and the members upon which the wheels are structurally mounted;

FIGURE 7 is a fragmentary view, to a larger scale, of a pulley arrangement associated with the bed of the wagon;

FIGURE 8 is a similar fragmentary view of another pulley arrangement associated with the bed of the wagon;

FIGURE 9 is a fragmentary view, to a larger scale, revealing the hold-down ring associated with the frame;

FIGURE 10 is a cross sectional view taken through the upper body portion at A—A in FIGURE 1 to reveal the position of the floor when it is partially loaded;

FIGURE 11 is a similar cross sectional view revealing the wagon more fully loaded than in FIGURE 10, with the floor in a correspondingly lower position; and FIGURES 12 and 13 are simplified views revealing the tilting of the upper body portion to accomplish the unloading of the cargo of produce.

Turning now to FIGURE 1, it may be seen that the support for wagon 10 is formed by a bed or chassis portion 11, upon which four or so wheels 12 may be mounted so as to enable the wagon to be pulled to and from a produce field or orchard. Resting upon the bed 11 is upper body portion 13 constituted by four upstanding sides, and it is of course in the upper body portion that the produce is carried.

As will be noted, the floor 14 is illustrated as being disposed in a comparatively high location in the upper body portion, with the arrangement being such that as more and more produce is loaded into the wagon, the floor can be caused to descend to accommodate more, and thus minimize the drop inside the wagon for the produce. Also, the upper body portion 13 is arranged to tilt about pivot or axis locations 15 at such time as the wagon has been fully loaded, to facilitate the unloading of the produce.

Referring to FIGURE 2 it will be noted that side 16 of the upper body portion is somewhat higher than the other three sides, including front side 17f, this additional height being occasioned by the fact that when the wagon is to be unloaded and the upper body portion 13 pivots at points 15 with respect to the bed 11, the side 16 is arranged to be caused by members 31f and 31r on the front and rear ends of the wagon, respectively, to pivot about points 18 (shown in FIGURE 1) so that the lower portion of side 16 actually stands away from the rest of the upper body portion as shown in FIGURES 12 and 13 to facilitate the unloading process. Side 16 is supported from vertical members 34 and 64, and these and other facets of the invention will be discussed in greater detail hereinafter.

FIGURE 2 reveals the floor 14 being disposed adjacent the top of the upper body portion 13, in the approximate position from which loading is to commence. In this view of the front of the wagon, flexible cables 19 and 20 are shown supporting the left and right front corners of the floor, with it of course being understood that similar cables are utilized for support at the rear corners of the floor.

Inasmuch as the upper body portion is to be tilted along axes 15 as shown in FIGURES 12 and 13, the supporting cables must not be allowed to interfere, and to that end I utilize pulleys at a number of locations in order that the cables may pass from the upper body portion 13 into the bed 11 at a location closely adjacent the axis 15, which of course enables the upper body portion 13 to be tilted without changing the effective lengths of the cables so as to markedly alter the floor position with respect to the rest of the upper body portion 13.

As appear in FIGURES 2, 3 and 5, there are floor support members at the four corners of the upper body portion which project outwardly from the floor through appropriate vertical slots, with the support cables being attached to these members. For example, cable 19 is attached to floor support member 21 and cable 20 is attached to floor support member 22. Quite obviously, as the produce is loaded higher and higher into the upper body, it becomes desirable to allow the four cables to move so as to permit the floor 14 to descend and thus make more room for additional produce. Floor support member 21 travels in vertical slot 23 and floor support member 22 travels in vertical slot 24.

The cable 19, after leaving the floor support member 21, loops over pulley 25 rotatably disposed on vertical member 34 of the upper body portion in substantial alignment with the pivot axis 18 of side 16, and then travels downwardly and loops around pulley 27, which is mounted on a hinge 15 about which the upper body portion 13 pivots during the dumping procedure. Cable 19 thereafter travels across the front structural member of bed 11, looping around pulley 29, and thence travels between the fore and aft structural members of the bed 11, and after turning around an additional pulley as shown in FIGURES 5 and 6, it attaches to the head of the piston rod of the pneumatic cylinder 46.

Similarly, cable 20 after leaving floor support member 22 extends around upper pulley 26 rotatably mounted near the top of upper body portion 13, as shown in FIGURE 2, and thence extends around pulley 28 located on a lower portion of the upper body portion 13. Cable 20 then extends across the lower portion of the upper body portion 13 and thence around a pulley (not shown) mounted behind pulley 27 that is also mounted upon hinge axis 15, and thereafter extends around pulley 30. Cable 20 thereafter travels adjacent cable 19 along the structural members of the bed 11 and around an additional pulley until such time as it also attaches to the head of the piston rod of the pneumatic cylinder 46.

Referring to FIGURE 3 it will be noted from this aft view that the cables 49 and 50 utilized for supporting the aft end of the floor 14 are secured to floor support members 51 and 52 respectively. Floor support member 51 is arranged to travel in vertical slot 53 and floor support member 52 travels in vertical slot 54.

Cable 49 travels first about pulley 55 mounted on vertical member 64 of the upper body member, as shown on the right in FIGURE 3, and thence about pulley 57 at the lower right and thereafter about pulley 59 before entering the under portion of the wagon. Similarly, cable 50 extends first about pulley 56 at the upper left and then about pulley 58 at the lower left before extending across the width of the wagon to travel about the pulley (not shown) that is behind pulley 57, and thereafter travels about pulley 60 before entering the underportion of the wagon essentially in parallelism with cable 49. Cables 49 and 50 both extend a substantial portion of the length of the wagon and then fasten to the head of the piston rod of the pneumatic cylinder 46, as shown in FIGURES 5 and 6.

Returning to FIGURES 1 and 2, it will be noted that the upper end of member 31f is pivotally attached to the upper portion of side 16 by pin or bolt 32, and the lower end of this member is attached to bed 11 by pin or bolt 33. In this manner, as the side of the upper body portion remote from axis 15 is lifted, which is the right side as viewed in FIGURE 2, this causes axis or pivot 18 to move to the left with respect to pin or bolt 32. (The axis of pulley 25 approximates the location of pivot 18.) Because the lower end of member 31f is pivotally anchored to bed 11, and this member is inextensible, as the upper body portion continues to tilt about axis 15, the portion of side 16 above support points 18 is in effect caused to move in a clockwise direction as viewed in FIGURE 2 with respect to axis 18, thus causing the lower part of side 16 to move away from the rest of the body portion as shown in FIGURES 12 and 13, and facilitating the dumping of the produce. After this has been completed, the side of the upper body portion that has been lifted is again lowered, and this in turn causes the side 16 to be restored to the positions shown in FIGURES 1 through 3, wherein it is essentially vertical, parallel to the side of the wagon shown in FIGURE 4, and essentially perpendicular to the floor 14.

Because this tilting action imposes a definite strain on axis 18, it is essential that vertical members 34 and 64 be of sturdy construction and properly braced. As seen in FIGURE 2, I provide a diagonal member 34a, which is attached to the upper end of member 34 above pivot 18, and which lends strength to this member while avoiding blocking the movements of cable attachment member 21, even when the floor 14 is near its uppermost position.

In a similar manner, the opposite end 17r of the wagon shown in FIGURE 3 is likewise equipped with a sturdy upright member, in this instance member 64, about which the other end of side 16 pivots. Along the lines described in connection with FIGURE 2, when the left hand side of the upper body portion shown in FIGURE 3 is lifted so as to cause a pivoting about axis 15, this causes the axis adjacent that of pulley 55 to move to the right with respect to the upper end of member 31r, thus contributing with member 31f an effort causing the bottom of side 16 nearest the rear of the wagon to move out to the dumping position depicted in FIGURES 12 and 13. Also as in FIGURE 2, reinforcement member 64a is attached to member 64 above the slot 53 to provide a stabilization for the upper end of member 64 at the time the tilting of side 16 takes place.

I preferably utilize for the structural steel members of my wagon, hollow steel tubing having a square or a rectangular cross section, as necessary for the purpose to be served. These hollow steel members are of course utilized to define the skeletal framework of the upper body portion, with plywood being utilized to form the upstanding members of the upper body portion so that produce cannot fall off the edges of floor 14 onto the ground. As an example, for the diagonal members such as 34a and 64a, I prefer ¼″ x 2″ x 2″ square tubing, whereas for vertical members, such as 34 and 64, I use ¼″ x 2″ x 4″ rectangular tubing. The beams under the floor are preferably ¼″ x 2″ x 4″ rectangular tubing, and the surface of the floor 14 may be ³⁄₁₆″ plate. Plywood is specified for enclosing the sides and ends not only because of its economy and lightness, but also because it is less heat absorbing than a metal. Excessive heat of course has a deleterious effect on certain produce.

Turning now to FIGURE 4 it will be seen from this side elevational view that the operator is furnished a lanyard 71 extending approximately the full length of the side of the wagon opposite to side 16, which lanyard can be pulled from any location along the side of the wagon so as to accomplish the periodic release of air from the pneumatic cylinder 46. This controlled release of air pressure may be accomplished by means of valve 72 equipped with a handle that is normally spring-biased to the closed position. The operator periodically pulls the lanyard for a few seconds to cause the bleeding of air for that length of time, this event taking place at intervals of time dependent upon the rate at which the wagon is being loaded with produce. In any event, the operator causes the lanyard to be pulled to open the valve each time the produce extends sufficiently high above the side of the wagon as to be easily visible from the operator's eye level. After bleeding an amount of air from behind the piston, the movable floor typically descends several inches under its own weight, thus creating additional room in the upper portion of the wagon to recieve additional produce. The piping connections associated with valve 72 will be discussed hereinafter, and valve 72 may for example be Versa product No. VBH–3303, made in Englewood, N.J.

Also visible in this figure and in FIGURE 4c is lifting ring 47, secured to a lower portion of the upper body portion at a location adjacent ring 48 rigidly affixed to bed or frame member 41. By virtue of a convenient lifting arrangement at the unloading station, such as a hydraulic lift, the upper body member of the wagon is caused to tilt about axis 15 as a result of the lifting of ring 47, thus to cause the unloading of the produce in the manner shown in FIGURES 12 and 13. I typically utilize a restraining member to engage ring 48 to prevent member 41 and thus the entire bed or chassis of the wagon from also tipping.

Turning now to FIGURE 5 it will be noted that the suspension arrangement for movable floor 14 is shown in considerable detail, with cables 19 and 20 being revealed to form the support for the floor adjacent the front end of the wagon, and cables 49 and 50 being revealed to be forming the support for the rear end of the floor. Intermediate pulleys 42 and 43 are arranged to receive cables 19 and 20. As will be apparent, each time the head 44 of piston rod 45 moves outwardly in the direction of the arrow say four inches, the cables move to allow the floor to descend the same amount.

Also in FIGURE 5, it will be noted that air line 73 is connected to the end of cylinder 46 that is adjacent the piston rod 45, and it is through this line that the motions of the piston of cylinder 46 are controlled. Line 73 branches into lines 74 and 75, with line 74 going to manually-operated release valve 72, and line 75 going to a manually operated fill valve 76. Flexible hose 74a is provided in line 74, which hose, as shown in FIGURES 2 and 6, is provided adjacent forward axis point 15 so as to enable this portion of air line 74 to easily flex as upper body portion 13 tilts.

The fill valve 76, shown only in FIGURE 4, is disposed in the air uspply line from a tractor used to pull the wagon, it being understood that the tractor normally has an air connection with the wagon, to be used for the operation of the wagon's air brakes. When the spring-biased handle of valve 76 is manipulated, air from the tractor's air supply is allowed to flow through lines 75 and 73, with it being understood that this air is used to fill the piston rod end of cylinder 46, and to cause the piston thereof (not shown) to move the desired distance toward the opposite end of the cylinder. When the handle of valve 76 is released, direct air communication between the tractor and the piston is cut off, with the floor thereafter being held in the position represented by the piston position. Although I prefer the position of fill valve 76 to be that as shown in FIGURE 4, I am of course not to be so limited.

The air displaced from cylinder 46 during the fill process escapes from port 77, disposed in the far end of the cylinder from the piston rod, as seen in FIGURES 5 and 6. Likewise, during the floor-lowering procedure, when the piston and piston rod move toward the rear of the wagon as a result of the manipulation of valve 72, air is allowed to enter the cylinder 46 through port 77 to avoid the creation of an undesirable vacuum condition.

Cylinder 46 may for example be a Carter Power Line #250 air cylinder, Model DN. Such a device has an 8 inch cylinder and a 42 inch stroke although I am of course not to be deemed limited to using this particular pneumatic cylinder. Also I am not to be limited to the use of a pneumatic cylinder as the energy storage means, for hydraulic, mechanical, or electrical arrangements could be used for raising the floor subsequent to each unloading procedure, and an escapement arrangement could be used for the incremental lowering of the floor as loading progresses. However, because of its effectiveness, simplicity and low cost, I prefer the above-described pneumatic arrangement.

Referring to FIGURE 6, it will be noted that bed 11 is principally constituted by fore and aft structural members 35 and 37 disposed in essentially parallel relationship, which are welded or otherwise secured to rear transverse member 36 and front transverse member 38 to form a rigid chassis or frame. Transverse members 39 and 40 secured to longitudinal members 35 and 37 serve to form additional support locations 15 about which the upper body portion on selected occasions pivots, whereas central transverse member 41 serves as a means for holding the frame 11 down while the upper body portion is caused to pivot or tilt to accomplish the unloading of the produce.

Further inspection of FIGURE 6 reveals that cables 19 and 20 extend between fore and aft structural members 35 and 37 for approximately one half of the length of the wagon, and thence extend around pulleys 42 and 43, best seen in FIGURES 5 and 7, and thereafter attach as previously mentioned, to the head 44 of piston rod 45 of pneumatic cylinder 46. In contrast, cables 49 and 50 travel from their respective pulleys 59 and 60 directly to the head 44 without any intermediate pulleys ordinarily being required.

Fragmentary FIGURE 7 reveals the mounting of pulleys 42 and 43, with upper cable 20 substantially encircling pulley 42 and lower cable 19 substantially encircling pulley 43. As will be apparent, these pulleys rotate substantially together in one direction during the lowering of the floor, and rotate substantially together in the opposite direction when the floor is once again being raised.

Fragmentary FIGURE 8 reveals the pulley arrangement utilized in the forward transverse structural member 38 through which cables 19 and 20 travel. Pulleys 29 and 30, like the pulley shown in FIGURE 7, travel substantially together in one direction as the floor is being lowered and substantially together in the opposite direction when the floor is again raised. As a matter of fact, pulleys 29 and 30 may be physically secured together, as may pulleys 42 and 43.

FIGURE 9 shows ring 48 secured adjacent the end of structural member 41, which ring, as previously indicated, is adapted to be engaged and held at such time as the side of the upper body portion is to be lifted, thus preventing the bed of the wagon from tending to tilt at the time the produce is being unloaded.

Turning to related FIGURES 10 and 11, which are cross-sectional views taken along lines A—A in FIGURE 1, it will be noted that the floor 14 appears in each of these figures. However, in FIGURE 10, the floor is adjacent the uppermost part of the upper body portion, thus minimizing the drop inside the wagon to be encountered by produce. For example, the produce may be falling off of a conveyor belt mounted on the upper portion of a harvesting machine adapted to travel through the fields. A string of wagons such as wagon 10 may accompany the harvesting machine, and by virtue of the fact that these wagons are desirably equipped with descending floor arrangements, the distance of the fall inside the wagons can be minimized.

After a quantity of produce has been loaded into the wagon, the operator will begin to note that produce is visible over the sides of the wagon, at which time he causes the floor 14 to descend a bit so that the upper body portion of the wagon can accommodate more produce. In the preferred embodiment, this of course is accomplished by the operator causing by manipulation of valve 72, a quantity of air to be bled from cylinder 46, thus allowing the piston of the cylinder to move and thus allow the four cables 19, 20 and 49, 50 to move so that the four corners of the floor 14 will be proportionately lowered.

FIGURE 11 shows the position of the floor after the wagon has become substantially fully loaded with produce. At this time the operator operates the tractor in such a manner that the next wagon of the string of wagons moves alongside the conveyor belt to be filled. All of the wagons are desirably equipped with arrangements whereby the floor can be lowered incrementally to prevent damage to the produce. After all the wagons of the string have thus been filled, they are pulled to the packing house, where unloading of each is accomplished in the manner depicted in FIGURES 12 and 13. As previously explained, side 16 is caused to swing away automatically as the upper body portion is tilted about axis 15, thus allowing the produce to be quickly unloaded, such as into a large vat of water.

Although I have shown and described a preferred embodiment of this invention, I am not to be limited to the precise details and arrangements set forth herein, except as required by the scope of the appended claims.

I claim:

1. A movable floor wagon for use in the loading and unloading of produce comprising an upper body portion for receiving produce or the like, and a chassis, said upper body portion having upstanding sides and being hingedly mounted upon said chassis so as to make possible a movement of the upper body portion into a dumping position, a movable floor supported within the sides of said upper body portion, floor support means for supporting said floor at any of a wide range of positions within said upper body portion, and for selectively lowering it in incremental steps with respect to said sides of said upper body portion as the loading procedure progresses, said floor support means being disposed with respect to said hinged relationship between upper body portion and chassis so as to be relatively unaffected in its relationship to the remainder of said upper body portion when latter portion is moved to the dumping position.

2. The movable floor wagon as defined in claim 1 in which said floor support means includes energy storage means, to which energy may be added to achieve a raising of the floor, and from which energy may be selectively released to bring about a lowering of the floor as loading progresses.

3. The movable floor wagon as defined in claim 2 in which said energy storage means is mounted upon said chassis and takes the form of a piston and cylinder arrangement, in which said piston moves along said cylinder in one direction as energy is added, and in the other direction when energy is released, and a plurality of flexible cables forming a connection between said floor and said piston, so that as said piston moves in said one direction, said floor is raised, and as it moves in said other direction, said floor is lowered, said cables extending between said chassis and said upper body portion adjacent the location of said hinge mounting so as not to prevent said upper body portion being moved on occasion to said dumping position, the length of said cables being such as to maintain said floor substantially perpendicular to said sides during the dumping procedure.

4. The movable floor wagon as defined in claim 1 in which one of said upstanding sides is pivotally mounted adjacent an upper location, and its lower portion is arranged, when said upper body portion is moved into the dumping position, to move away from the remaining sides so as to simplify the unloading procedure.

5. A movable floor wagon for use in the loading and unloading of produce comprising an upper body portion for receiving produce or the like, and a chassis for supporting said upper body portion, said upper body portion having upstanding sides and being hingedly mounted upon said chassis so as to make possible a movement of the upper body portion into a dumping position, a floor supported within the sides of said upper body portion, and being movable between raised and lowered positions, floor support means for supporting said floor, and for lowering it with respect to said sides of said upper body portion as the loading procedure progresses, said floor support means normally lowering said floor on an increment by increment basis from a raised position to a lowered position, said floor support means being disposed with respect to said hinged relationship between upper body portion and chassis so as to avoid materially altering the relationship of the floor to the remainder of said upper body portion when latter portion is moved to the dumping position.

6. The movable floor wagon as defined in claim 5 in which said floor support means includes energy storage means from which stored energy is selectively released to bring about the lowering of said floor, and means for replenishing the energy in said energy storage means to restore said floor to the raised position.

7. The movable floor wagon as defined in claim 6 in which said floor is supported within said upstanding sides by flexible cables, said energy storage means having a movable portion and a relatively stationary portion, with the ends of said cables remote from said floor being attached to said movable portion so as to bring about floor movements as said movable portion of said energy storage means moves with respect to said stationary portion, said cables passing close by said hinged connection between said upper body portion and said chassis, so that said cables will not interfere with dumping movements, with the lengths of said cables being such that said floor will remain substantially perpendicular to said upstanding sides during latter movement.

References Cited

UNITED STATES PATENTS

| 813,059 | 2/1906 | Praed | 220—93 |
| 1,729,667 | 10/1929 | Marx | 298—1 |
| 2,650,464 | 9/1953 | Bernheim | 214—41 X |
| 3,019,054 | 1/1962 | Stahly | 298—18 |

FOREIGN PATENTS

| 948,046 | 8/1956 | Germany. |

RICHARD J. JOHNSON, *Primary Examiner.*